United States Patent
Hejl et al.

(10) Patent No.: US 9,574,101 B2
(45) Date of Patent: Feb. 21, 2017

(54) ACRYLIC DISPERSIONS WITH MULTI-FUNCTIONAL ACRYLATES FOR UV-CURE COATINGS

(71) Applicant: Rohm and Haas Company, Philadelphia, PA (US)

(72) Inventors: Andrew Hejl, Lansdale, PA (US); Eric Greyson, Blue Bell, PA (US); Wenqin Wang, Phoenixville, PA (US)

(73) Assignee: Rohm and Haas Company, Philadelphia, PA (US)

( * ) Notice: Subject to any disclaimer, the term of this patent is extended or adjusted under 35 U.S.C. 154(b) by 251 days.

(21) Appl. No.: 14/107,176

(22) Filed: Dec. 16, 2013

(65) Prior Publication Data

US 2014/0179823 A1 Jun. 26, 2014

Related U.S. Application Data

(60) Provisional application No. 61/740,741, filed on Dec. 21, 2012.

(51) Int. Cl.
| | | |
|---|---|---|
| *C09D 4/06* | (2006.01) | |
| *C09D 5/00* | (2006.01) | |
| *C09D 133/08* | (2006.01) | |

(52) U.S. Cl.
CPC ............... *C09D 133/08* (2013.01); *C09D 4/06* (2013.01); *C09D 5/00* (2013.01)

(58) Field of Classification Search
CPC ..................................... C09D 4/06; C08F 5/00
See application file for complete search history.

(56) References Cited

U.S. PATENT DOCUMENTS

| | | | |
|---|---|---|---|
| 5,409,971 | A | 4/1995 | Wolfersberger et al. |
| 5,441,775 | A | 8/1995 | Beck et al. |
| 5,700,576 | A | 12/1997 | Brehm et al. |
| 6,653,394 | B1 * | 11/2003 | Meisenburg et al. ......... 524/589 |
| 7,193,005 | B2 | 3/2007 | Leuninger et al. |
| 2008/0139708 | A1 | 6/2008 | Perrine |
| 2008/0214694 | A1 | 9/2008 | Yokota et al. |

FOREIGN PATENT DOCUMENTS

| | | |
|---|---|---|
| CN | 101654570 A | 2/2010 |
| EP | 0486278 A1 | 5/1992 |
| EP | 2371870 A1 | 10/2011 |
| JP | 2009084447 A | 4/2009 |
| WO | 9937731 A1 | 7/1999 |
| WO | 0024786 A1 | 5/2000 |

\* cited by examiner

*Primary Examiner* — Sanza McClendon
(74) *Attorney, Agent, or Firm* — Andrew Merriam

(57) ABSTRACT

The present invention provides low solvent or substantially solvent-free multi-ethylenically unsaturated acrylate composition imbibed particles of an acid functional group containing acrylic polymer for ultraviolet curing coating applications and methods of making the same wherein the acrylic polymer is formed by polymerizing in organic solvent, then neutralized and combined with a multi-ethylenically unsaturated acrylate composition prior to dispersing the mixture into water and, preferably, removing solvent.

11 Claims, No Drawings

ACRYLIC DISPERSIONS WITH MULTI-FUNCTIONAL ACRYLATES FOR UV-CURE COATINGS

The present invention relates to methods for making aqueous dispersions for use in ultraviolet (UV) curing coating. More particularly, it relates to methods comprising polymerizing one or more acrylate monomers and at least one ethylenically unsaturated acid functional monomer to form a solution polymer in organic solvent, neutralizing the acid functional groups in the solution polymer, combining the neutralized solution polymer with one or more multi-ethylenically unsaturated acrylate composition of monomers and/or oligomers to form an organic mixture and dispersing the thus formed organic mixture in water. The solvent can then be removed to give a solvent-free aqueous dispersion. In addition, the present invention relates to storage stable aqueous acrylic polymer dispersions containing the multi-ethylenically unsaturated acrylate composition.

Known aqueous acrylic dispersion coating compositions for wood substrates have suffered from poor appearance relative to coatings made from solvent-borne polymers or other, more expensive aqueous coatings, like polyurethane dispersions (PUDs). UV curable acrylic coating compositions have been useful in making better performing coating compositions for use on wood. And some acrylic polymer aqueous dispersions, like urethane acrylic hybrid compositions, have been used in making a wide variety of coatings, including those that provide acceptable finishes on wood. However, UV curable acrylic coating compositions do not usually comprise acrylic polymers because such polymers do not contain residual unsaturation functionality. To provide unsaturation functionality, multi-ethylenically unsaturated acrylate monomers can be added to aqueous acrylic polymer dispersions. However, many multi-ethylenically unsaturated monomers are sensitizers and are classified as irritants; and many such monomers, especially those having multiple (≥3) ethylenically unsaturated groups, cannot be transported into a polymer dispersion particle to make storage stable aqueous dispersions.

European Patent Publication no. EPC486278A1, to Rohm and Haas, discloses aqueous dispersions of emulsion polymers and multifunctional acrylates that provide UV curing coating compositions that are useful for wood applications and which yield coatings with good direct impact properties. Such compositions are formed by combining the multifunctional acrylate monomers with the emulsion polymer after the polymer is formed, thereby making compositions that exhibited on storage visible separation of an oil phase from the milky emulsion polymer in cases where the multifunctional acrylate monomer had more than three acrylate groups on average or was not sufficiently water soluble or water dispersible to transport through water into the emulsion polymer particle. Thus, unless one were to select a water soluble or water dispersible monomer, it was not possible to transport the multifunctional acrylates through the aqueous phase into an existing emulsion polymer using this approach. As a result, dispersions made in the scope of this disclosure suffered from separation of the monomer(s) as an oil phase.

The present inventors have endeavored to solve the problem of providing UV curing aqueous coating compositions of acrylic polymers and multi-ethylenically unsaturated acrylate monomers and/or oligomers having an average acrylate functionality of 3.2 or higher that do not suffer from monomer separation problems and which provide a warm coating appearance on wood.

STATEMENT OF THE INVENTION

1. Methods of making ultraviolet (UV) curing aqueous coating compositions comprise polymerizing in organic solvent solution a monomer mixture of i) from 47 wt. % to 100 wt. %, based on the total weight of monomer solids in the monomer mixture, or, preferably, 80 wt. % or more, or, more preferably, 90 wt. % or more, of one or more $C_1$ to $C_3$ alkyl acrylate monomers, preferably, methyl acrylate, ii) from 2.25 to 8 wt. %, or, preferably, from 2.5 to 5.5 wt. %, or, more preferably, up to 4.5 wt. %, based on the total weight of monomer solids in the monomer mixture, of an ethylenically unsaturated acid functional monomer, and iii) the remainder of one or more vinyl monomer, preferably, an alkyl methacrylate, cycloalkyl methacrylate, $C_4$ to $C_8$ alkyl acrylate or cycloalkyl acrylate monomer, or, more preferably, methyl methacrylate, to form an acrylic solution polymer, preferably, a branched polymer, having acid functional groups and having a number average molecular weight of from 3,500 to 50,000 g/mole, neutralizing at least a portion of the acid functional groups in the acrylic solution polymer to form a neutralized acrylic solution polymer, combining the neutralized acrylic solution polymer with a multi-ethylenically unsaturated acrylate composition comprising one or more monomer, oligomer or a mixture thereof, such that the one or more monomer composition has on average of from 3.2 to 10 ethylenically unsaturated groups, or, preferably, from 3.5 to 6.5 ethylenically unsaturated groups, or, more preferably, 3.9 or more ethylenically unsaturated groups and such that the oligomer or mixture thereof composition has on average from 3.2 to 20 ethylenically unsaturated groups, or, preferably, from 3.5 to 10 ethylenically unsaturated groups, or, more preferably, from 3.5 to 6.5 ethylenically unsaturated groups, in the amount of from 20 to 80 wt. %, or, preferably, from 30 to 50 wt. %, or, more preferably, from 30 to 48 wt. %, based on the total weight of the acrylic solution polymer solids and monomer solids, to form an organic mixture, and dispersing the organic mixture in water to form an aqueous dispersion of monomer imbibed acrylic solution polymer particles. Preferably, the methods further comprise removing organic solvent from the aqueous dispersion, e.g. by stripping or flashing, to give a substantially solvent-free aqueous dispersion; such methods may also remove residual monomers.

2. In the method 1, preferably, to improve the pencil hardness of UV cured coatings made therewith, the acrylic solution polymer may have a number average molecular weight of from 4,500 to 40,000 g/mol, or, more preferably, 10,000 or more g/mol.

3. In the methods of 1 or 2, the monomer mixture further comprises a chain transfer agent, such as, for example, n-dodecylmercaptan (nDDM), or, preferably, a polyfunctional chain transfer agent having two or more chain transfer functional groups, such as a tetrafunctional chain transfer agent, in the amount of from 1 to 5 wt. %, based on the total weight of monomer solids in the monomer mixture, or, preferably, from 2 to 4.5 wt. %.

4. Preferably, in the methods of any of 1, 2 or 3, the methods can further comprise inhibiting unwanted polymerization of the multi-ethylenically unsaturated acrylate monomer or oligomer, such as by adding a quinine or nitroxide after the initial acrylic polymerization.

5. In the methods of any of 1, 2, 3 or 4, the monomer mixture is such that the acrylic solution polymer has and an acid number of from 14 to 50, or, preferably, from 15 to 36, and having a number average molecular weight of from 3,500 to 50,000 g/mole.

6. In the methods of any of 1, 2, 3, 4 or 5, neutralizing the acrylic solution polymer comprises neutralizing from 40 to 100% of the acid functional groups in the acrylic solution polymer, preferably, 60% or more, or, more preferably, 90% or more of such groups, to form a neutralized acrylic solution polymer.

7. In the methods of any of 1, 2, 3, 4, 5 or 6, neutralizing the acrylic solution polymer comprises contacting the acrylic solution polymer with an amine neutralizer, such as an alkyl amine or a hydroxyl group containing amine, or, preferably, a tertiary alkyl amine, such as triethylamine, or, preferably, a neutralizer having a pKa of greater than 9.5.

8. The resulting solvent free aqueous dispersion made by the methods of any of 1, 2, 3, 4, 5, 6 or 7 can comprise water in the amount of from 40 to 75 wt. %, based on the total weight of the composition, or, preferably, from 45 to 65 wt. %.

9. The resulting solvent free aqueous dispersion made by the methods of any of 1, 2, 3, 4, 5, 6 or 7, and comprising a coating composition having one or more ultraviolet (UV) initiator and particles of acrylate polymer containing a multi-ethylenically unsaturated acrylate composition.

10. The resulting solvent free aqueous dispersion made by the methods of any of 1 to 7, above, can comprise a total solids content of from 25 to 60 wt. %, based on the total weight of the composition, or, preferably, from 40 to 55 wt. %.

All ranges are inclusive and combinable. For example, a weight percentage of 0.1 to 1 wt. %, preferably, 0.2 wt. % or more, or, preferably, up to 0.6 wt. % includes ranges of from 0.1 to 0.2 wt. %, from 0.1 to 0.6 wt. %, from 0.2 to 0.6 wt. %, from 0.2 to 1.0 wt. %, or from 0.1 to 1.0 wt. %.

Unless otherwise indicated, any term containing parentheses refers, alternatively, to the whole term as if no parentheses were present and the term without them (i.e. excluding the content of the parentheses), and combinations of each alternative. Thus, the term "(meth)acrylate" refers to any of an acrylate, a methacrylate, and mixtures thereof.

Unless otherwise specified, all temperature units refer to room temperature (~20-22° C.) and all pressure units refer to standard pressure.

As used herein, the term "ASTM" refers to the ASTM International of Conshohocken, Pa.

As used herein, unless otherwise indicated, the term "acid number" refers to the quantity in mg KOH/g polymer determined by titration as needed to neutralize all of the acid groups in a given polymer. The term "calculated acid number" refers to the acid number calculated based on the proportion of acid monomers charged to the polymerization as is known in the art. For example, a methacrylic acid (MAA) level in the acrylic solution polymer of 4 wt. % MAA, based on the total weight of monomers used to make the polymer, corresponds to a calculated acid number of 26.

As used herein, unless otherwise indicated, the term "number of ethylenically unsaturated groups" in a multi-ethylenically unsaturated acrylate composition refers to the number of acrylate groups in that monomer according to the monomer or oligomer supplier's product literature.

As used herein, the term "average number of ethylenically unsaturated groups" in a multi-ethylenically unsaturated acrylate composition is a weighted average number of ethylenically unsaturated groups in each of the monomers in that composition. Thus, for example, when such acrylate compositions comprise only one multi-ethylenically unsaturated acrylate monomer, the composition is said to comprise the average number of ethylenically unsaturated groups reported for that monomer in the monomer supplier's product literature, such as 4 for a tetraacrylate; and, for example, when a composition comprises a 50/50 wt. % monomer blend of each of a triacrylate and a tetraacrylate, the composition has monomer composition with an average of 3.5 ethylenically unsaturated groups.

As used herein, the term "number average molecular weight" refers to the average molecular weight of a polymer as determined by gel permeation chromatography (GPC) as against a polystyrene standard.

As used herein, the term "substantially solvent-free" means any composition containing less than 0.5 wt. % of solvent, based on the total weight of the composition, preferably, 2500 ppm or less. For purposes of this definition, solvent shall include residual monomer.

As used herein, the term "total weight of monomers used to make the polymer" means the weight of all monomers used to make the acrylic solution polymer, including the weight of any chain transfer agent(s) used.

As used herein, the term "total solids" for the aqueous dispersions of the present invention refers to all polymers and monomers and/or oligomers in the aqueous dispersions. For formulations, this includes all polymers, oligomers and monomers and all non-volatile additives, and excludes water.

As used herein, the term "warmth" is visually evaluated on the basis of a pass-fail test. A coated wood substrate that exhibits more reddish-yellow hues than a comparative control panel coated with a two stage butyl acrylate, styrene emulsion copolymer having a number average molecular weight of at least 100,000 and having in its outer stage about 6.3 wt. % of carboxylic acid functional groups and about 18.7 wt. % of ethylenically unsaturated methacrylate functional groups, based on the total weight of monomers used to make the copolymer is considered to have passed the test and a coated wood substrate that exhibits same or more bluish hues and grays than those in the coating of the comparative control panel is considered to have failed the test.

The present inventors have found that a combination of an acrylic solution polymer from an acrylate monomer and a monomer having acid functionality can, when mixed with a multi-ethylenically unsaturated acrylate monomer and dispersed into water provides UV curing compositions that can be formulated into a UV curing coating composition which exhibits excellent appearance, especially warmth, when coated on wood and that can maintain excellent coating performance properties. The resulting dispersions when applied to wood exhibit an appearance comparable to solvent borne coatings or waterborne polyurethane dispersions (PUDs). When subjected to UV irradiation the final coating properties are acceptable for aqueous UV-cure coatings. The compositions comprise acrylate polymer particles imbibed with multi-ethylenically unsaturated acrylate monomers. Quite unexpectedly, the present inventors have found that including the multi-ethylenically unsaturated acrylate monomers in the acrylate solution polymer before dispersing the composition into water had several beneficial effects on the stability of the resulting aqueous dispersions. The particle size of the inventive dispersions is lower than that of an aqueous dispersion of the acrylate polymer alone. In Examples 6 and 7, below, when the same acrylate polymer dispersions are measured by a BI-90 light scattering technique, the reported particle sizes are 244 nm with no multi-ethylenically unsaturated acrylate compositions and 95 nm with the multi-ethylenically unsaturated acrylate composition, specifically, dipentaerythritol pentaacrylate. Despite the fact that typically dispersion viscosity increases as particle size goes down, the presence of the multi-ethylenically unsaturated acrylate monomers allows the dispersions to be made at higher solids. Further, the addition of multi-ethylenically unsaturated acrylate composition tends to increase the stability of the final dispersions. When sitting on the shelf for 6 months, the aqueous dispersion of comparative Example 6 has completely settled out while the dispersion Example 7 of the present invention remains a uniform dispersion. Where settling of larger particle size acrylic dispersions was observed the results ranged from a softpacked material that could be redispersed with additional agitation to settling that resulted in a nearly clear aqueous liquid taking up most of the sample jar.

Polymerization of the monomer mixture in organic solvent can be carried out via conventional methods in the presence of one or more initiator in one or more solvents where the polymerization temperature is at or below the boiling point of the solvent.

Suitable initiators may include any thermal initiators compatible with solvent systems, preferably, those which have a half life of less than 120 minutes at 80° C., such as organic peroxides, organic hydroperoxides, peroxyesters, peroxydicarbonates, diacyl peroxides, peroxyketals, and organic azo compounds, for example, t-butyl peroxypivalate and 2,2'-azobis (2,4-dimethyl-valeronitrile) each of which are preferred.

Suitable solvents are generally liquids which are inert toward the co-reactants under the reaction conditions, examples being ethers such as ethylene glycol ethers and ethylene diglycol ethers, esters such as butyl acetate, ketones such as methyl amyl ketone, alkylaromatics, such as toluene, the isomeric xylenes, and cumene, and aliphatic alcohols, such as isopropanol, etc. Preferred is methyl ethyl ketone (MEK).

The monomer mixture comprises one or more i) $C_1$ to $C_3$ alkyl acrylate, preferably, methyl acrylate, which has the most backbone hydrogens that can be abstracted in a UV curing process and has a small side chain that will not hinder UV curing.

The monomer mixture further comprises one or more ii) ethylenically unsaturated acid functional monomer, such as, for example, carboxylic acid monomers like acrylic acid, methacrylic acid, itaconic acid and maleic acid, as well as half esters of itaconic or maleic acid; phosphorus acid monomers, such as phosphoalkyl acrylates or methacrylates, sulfonic acid monomers, such as 2-acrylamido-2-methylpropane sulfonic acid; and mixtures thereof.

The monomer mixture may further comprise one or more iii) vinyl monomers, such as, for example, alkyl methacrylates, such as methyl methacrylate; vinyl esters, such as, vinyl acetate; allyl ethers and their mixtures.

Preferably, to enable better flow and coating appearance, the acrylic solution polymer has a number average molecular weight below 40,000. This is a relatively low molecular weight compared to that of emulsion polymers which generally have a minimum weight average molecular weight of about 100,000.

To help lower the acrylic solution polymer molecular weight, a chain transfer agent (CTA) may be included in the monomer mixture. Suitable CTAs may include, for example, dodecylmercaptan, hexyl mercaptan, octylmercaptan, butylmercaptopropionate, methylmercaptopropionate, hydroxy group containing mercaptans, such as hydroxyethyl mercaptan, and mercaptopropionic acid. Preferably, the CTA is multifunctional so it provides a branched acrylic solution polymer. An example of a preferred CTA is tetrakis(pentaerythritoltetramercaptopropionate) (PETMP).

In neutralizing the acrylic solution polymer of the present invention, one can add an excess of neutralizer in the amount up to 120% of the acid equivalent groups in the polymer. Too much neutralizer can cause odors or water sensitivity. A less neutralized form (e.g. only 20 to 60% or 40 to 60% of acid functional groups neutralized) of acrylic solution polymer can contain a higher proportion of copolymerized acid functional monomers without causing undue thickening to occur upon dispersion into water.

Suitable neutralizers may include, for example, alkaline organic and/or alkaline inorganic compounds, such as alkali (ne) metal hydroxides, such as NaOH. Besides aqueous ammonia, ethylamine and dimethylamine, volatile primary, secondary and tertiary amines, such as dimethylethanolamine, morpholine, N-methylmorpholine, piperidine, diethanolamine, triethanolamine, diisopropylamine, 2-amino-2-methylpropanol and 2-N,N-dimethylamino-2-methylpropanol or mixtures of these compounds may be used. Preference is given to tertiary amines, such as triethylamine, diisopropylethylamine and N-methylmorpholine, for example. Mixtures of neutralizing amines are likewise suitable. Ammonia may be used, however, it can lead to yellowing in UV curing applications if not flashed off prior to cure.

Preferably, to prevent premature polymerization of the multi-ethylenically unsaturated acrylate composition by residual initiators in the aqueous dispersions of the present invention, an inhibitor may be added to the acrylic solution polymer after polymerization is complete. Inhibitors are usually used in amounts of from 1 to 5000 ppm, preferably from 1 to 1000 ppm.

Examples of suitable inhibitors may include phenothiazines, sterically hindered o-phenols, monoethers of hydroquinone, and nitroxide radicals preferably, monomethyl ether of hydroquinone, 2,6-di-t-butyl phenol, 2,2,6,6-tetramethylpiperidin-1-oxyl, and 4-hydroxy-2,2,6,6-tetramethylpiperidin-1-oxyl (TEMPO). Suitable amounts of inhibitors may range from 100 to 1000 ppm, based on total multi-ethylenically unsaturated acrylate monomer solids, preferably, 250 ppm or below.

The multi-ethylenically unsaturated acrylate compositions of the present invention can include any acrylate monomer or oligomer composition having an average of 3.2 or more ethylenically unsaturated or acrylate groups. Unless otherwise indicated, the number of acrylate groups in a given monomer is determined according to its formula. Suitable triacrylates for blending with monomers having more than three acrylate groups include, for example, pentaerythritol triacrylate, trimethylolpropane triacrylate (TMPTA), trimethylolpropane triethoxytriacrylate (3EO-TMPTA), glyceryl tripropoxytriacrylate, and glyceryl tri(oligopropoxy)triacrylate wherein the oligopropoxy groups have from 1 to 3 propoxy groups; suitable tetraacrylates may include, for example, ditrimethylolpropane tetraacrylate (DTMPTA), tetrafunctional polyester acrylates; suitable pentaacrylates may be those, such as, for example, dipentaerythritol pentaacrylate (DPEPA); higher functional acrylates may include, for example, dipentaerythritol hexaacrylate (DPHA). Mixtures of any such monomers may be used. Oligomers refer to multi-ethylenically unsaturated acrylates having repeat backbone units, such as polyester acrylates, polycarbonate acrylates, urethane acrylates, and epoxy acrylates.

Preferably, the multi-ethylenically unsaturated acrylate monomer or oligomer is one having a water solubility of less than 0.25 g, or, preferably, less than 0.15 g or less, or, more preferably, 0.1 g or less in 100 g of water at 25 deg C.

Examples of suitable commercially available multi-ethylenically unsaturated acrylates may include, for example, any of SR351 trimethylolpropane triacrylate (TMPTA), SR454 trimethylolpropane triethoxytriacrylate (3EO-TMPTA), SR 9020 glyceryl tripropoxytriacrylate, CD9021 glyceryl tri(oligopropoxy)triacrylate wherein the reported total number of propoxy groups is 5.5, SR355 ditrimethylolpropane tetraacrylate (DTMPTA), CN2262 polyester acrylate oligomer, CN2302 hyperbranched polyester acrylate oligomer, PS4350 and PS 4650 tetrafunctional polyester acrylates from Miwon Commercial Co., Ltd. (Anyang, KR), and SR399LV dipentaerythritol pentaacrylate (DPEPA), EM265 dipentaerythritol hexaacrylate from Eternal Chemical Co., Ltd. (Taiwan). Unless otherwise indicated, all such monomers are available from Sartomer USA, LLC (Exton, Pa.).

The best balance of properties in coatings may be obtained by selecting multi-ethylenically unsaturated acrylate monomer or oligomer compositions having an average number of ethylenically unsaturated acrylate functionalities ranging from, for the monomers, from 3.2 to 8, or, preferably, from 3.9 to 6.5 groups and, for the oligomers, from 3.2 to 10 groups, or, preferably, from 3.9 to 10 groups.

Additional acrylic oligomers may also be included as multi-ethylenically unsaturated acrylate monomers in mixtures of such monomers so long as the multi-ethylenically unsaturated acrylate composition has the desired average number of acrylate groups. Such additional acrylates may be diacrylates, such as, for example, polyester diacrylates, hyperbranched polyester diacrylates, bisphenol epoxy diacrylates, or urethane-acrylates.

Preferably, the aqueous dispersions are treated to remove all or nearly all of the solvent therefrom. Such removing may be carried out by conventional methods, such as by flashing or stripping off volatiles under vacuum or at a temperature above the boiling point of the solvent but below 100° C.

The compositions of the present invention can be formulated into UV curing coating compositions. Such compositions include photoinitiators and may include additives.

Suitable photoinitiators may include, for example, α-hydroxyketones, such as DAROCUR™ 1173, a 2-Hydroxy-2-methyl-1-phenyl-propan-1-one (BASF, Germany), benzophenones, benzoin dimethyl ether, 2-hydroxyl-2-methyl-1-phenyl acetone, 1-hydroxyl-cyclohexyl phenyl acetone, phenylglyoxylates, 1,2,2-dimethoxy, 2-diphenyl butanone, di(2,4,6-trimethyl benzoyl) phenylphosphine oxide, benzyldimethyl-ketal, alpha-aminoketone, monoacyl phosphines, bis-acyl phosphines, phosphine oxides and diethoxyacetophenone (DEAF), and their mixtures. The total amount of photoinitiator useful may range from 0.5 to 4 wt. %, based on the total solids, or, preferably, from 1 to 2 wt. %.

Additives may include, for example, coalescents, such as DOWANOL™ DPM glycol ether, in small amounts of 3 wt. % or less; flatting agents, such as matting agent in the amount of 3 wt % or less, surfactants, such as BYK-346 (Byk USA Inc, Wallingford, Conn.), a solution of a polyether modified siloxane in dipropyleneglycol monomethylether (48 wt. %) (Altana Group, DE) or Surfynol™ 104, a2,4,7,9-tetramethyl-5-decyne-4,7-diol (Air Products, Allentown, Pa.) in the total amount of 2 wt % or less, wetting agents, defoamers, and rheology modifiers in the amount of 1.5 wt % or less, such as ACRYSOL™ RM-8W hydrophobically modified ethoxylated urethane (HEUR) polymer (Dow Chemical)

EXAMPLES

The following Examples seek to illustrate the present invention.

The abbreviations or names given to materials used in the Examples below have the following meanings:

Comparative Emulsion Polymer A: A two stage butyl acrylate, styrene emulsion copolymer having a number average molecular weight of at least 100,000 and having in its outer stage about 6.3 wt. % of carboxylic acid functional groups and about 18.7 wt. % of ethylenically unsaturated methacrylate functional groups, based on the total weight of monomers used to make the copolymer CYTEC™ 7177: An ultraviolet (UV) curing aliphatic polyurethane aqueous dispersion exhibiting acceptable coating properties.

The following test methods were used:

1-Hour and 16-Hour Chemical Resistance:

Performed using 50 wt. % ethanol (EtOH) in water, isopropyl alcohol (IPA), n-butyl acetate, and methyl ethyl ketone (MEK) as chemicals. The 16-hour chemical resistance test was performed using water, 50% ethanol (EtOH) in water, FORMULA 409™ cleaner (The Clorox Company, Oakland, Calif.), and red ink. For chemical resistance tests, a 23 mm diameter Whatman filter paper was put on the film and covered with the chemical. The chemical spots where then covered with caps to limit evaporation during the test. After the indicated amount of time, the residual solvents were wiped off, and the panels were rated immediately based on the damage to the film on a 1-10 scale. Values of 3 and below indicate actual damage to the film. Values of 4-7 indicate more to less obvious appearance damages. Values of 8-9 indicate subtle appearance/gloss changes visible only from a few angles. A value of 10 indicates no change. An 8 or better is acceptable.

Hot Water Resistance:

An approximately 2.5 cm by 2.5 cm square piece of felt was soaked with boiling hot water and placed on the coated panel. The felt was then covered with a metal can filled with boiling water to maintain high temperature for a long time. After 1 hour, the water was wiped off, and the panels were rated immediately based on the damage to the film on a 1-10 scale. Values of 4-7 indicate more to less obvious appearance damages. Values of 8-9 indicate subtle appearance/gloss changes visible only from a few angles. A value of 10 indicates no change. An 8 or better is acceptable.

Resistance to Monomer Separation:

Aqueous dispersions were let stand at room temperature for a period of at least 1 month at room temperature and observed for the existence of a visible (separated) oil layer. If visual inspection revealed no separate oil phase or layer in the composition, then the composition was deemed resistant to monomer separation.

König Hardness:

Measured on aluminum panel according to ASTM D4366-95 (1995) using a TQC SP0500 Pendulum Hardness Tester by TQC Thermimport Quality Control (The Netherlands). The results were reported in seconds. Three measurements were made on each cured film, and the average value is reported here. An acceptable result is 100 seconds or more.

Pencil Hardness:

Performed according to ASTM D3363-05 (2011)e2, Standard Test Method for Film Hardness by Pencil Test. The hardness was reported as the hardest lead that will leave the film uncut for a stroke length of at least ⅛". An acceptable pencil hardness is H or better, preferably, 2H or better.

Gloss:

Of coatings was measured using micro-TRI-gloss meter from BYK Gardner (Byk USA Inc, Wallingford, Conn.). The measurement provided specular gloss of coatings at angles of 20°, 60°, and 85°. Three measurements were made on each cured film, and the average value is reported here. Acceptable gloss measures are 100 or more except for 20° gloss, which may be 80 or more.

Mandrel Bend:

To evaluate the flexibility of a film coated on phosphate pretreated aluminum panels. The test specimen, approximately 1.2×10 cm, was prepared by cutting the aluminum panel on a metal cutter. Sufficient force was applied suddenly to bend the panel 180° over the mandrel starting with the largest diameter. The smallest diameter at which the sample does not show any cracks is recorded. If no cracks are observed on the 3 mm (1/8") mandrel, then a 3 mm (1/8") value will be recorded. Acceptable Mandrel Bend results are 19 mm (3/4") or smaller.

Particle Size (PS):

Particle size was an average measured using and reported by a 90 Plus particle size analyzer from Brookhaven Instruments Corporation (Holtsville, N.Y.) calibrated to manufacturer's recommendation.

Example 1

50 wt. % (92.0 MA/4.0 MAA/4.0 nDDM)//50 wt. % DPEPA

A 3-L flask equipped with a mechanical stirrer and reflux condenser was charged with methyl ethyl ketone (206.4 g) and heated to 80° C. A monomer mixture was prepared with methyl acrylate (MA) (276 g), methacrylic acid (MAA) (12 g), and 1-dodecylmercaptan (nDDM) (12 g). An initiator feed was prepared by dissolving azo-bisisobutyronitrile (AIBN) (6 g) in methyl ethyl ketone (MEK) (74 g). The monomer mixture was fed in over 2 hours then rinsed with 25 g MEK, while the initiator mix was fed in over 2.5 hours, enabling a 30 minute overfeed. Following completion of the initiator feed the reaction was held at 80° C. for 2 hours. After the 2 hour hold the reaction was cooled to 60° C. At 60° C. triethyl amine (12.7 g) was charged and the mixture held for 10 minutes. At this point 2,2,6,6-Tetramethyl-1-piperidinyloxy (TEMPO) (0.075 g in 7.50 g MEK) was added to inhibit the reaction and held for an additional 10 minutes. After the inhibitor was charged the multi-ethylenically unsaturated monomer dipentaerythritol pentaacrylate (300 g) was added to the reaction mixture. After letting the multi-ethylenically unsaturated monomer mix in for 10 minutes the entire mixture was transferred to a dispersion vessel with stirring water (1050 g) over a period of 15 minutes. The next day, the aqueous dispersion was transferred to a mechanically stirred 5-L round bottomed flask equipped with a thermocouple and vacuum adaptor. The MEK solvent was removed under vacuum (down to approximately 10 torr) and collected with a dry ice condenser. The stripping was conducted for approximately 2 h and maintained at a temperature of 10-25° C. The resulting dispersion was filtered through a 100 mesh screen.

Example 2

70 wt. % (84.8 MA/10.0 MMA/4.0 MAA/1.2 PETMP)//30 wt. % DTMPTA

A 1-L flask equipped with a mechanical stirrer and reflux condenser was charged with methyl ethyl ketone (MEK) (126.8 g) and heated to 80° C. A monomer mix was prepared with methyl acrylate (MA) (254.4 g), methyl methacrylate (30.0 g), methacrylic acid (MAA) (12 g), and pentaerythritol tetrakis(3-mercaptopropionate) (PETMP) (3.6 g). An initiator feed was prepared by diluting TRIGONOX™ 25-C75 (t-butylperoxypivalate, 75% in mineral spirits) (5 g) with methyl ethyl ketone (55 g). The monomer mix was fed in over 2 hours then rinsed with 20 g MEK, while the initiator mix was fed in over 2.5 hours, enabling a 30 minute overfeed then rinsed with 5 g MEK. Following completion of the initiator feed the reaction was held at 80° C. for 2 hours. After the 2 hour hold the reaction was cooled to 60° C. At 60° C. 2,2,6,6-Tetramethyl-1-piperidinyloxy (TEMPO) (0.061 g in 1.17 g MEK) was added to inhibit the reaction and held for an additional 10 minutes. After the inhibitor was charged the multi-ethylenically unsaturated monomer ditrimethylolpropane tetraacrylate (128.45 g) was added to the reaction mixture. After letting the multi-ethylenically unsaturated monomer mix in for 10 minutes the entire mixture was transferred to a dispersion vessel where ammonia (29% aqueous, 7.37 g) was dissolved in stirring water (768 g) over a period of 15 minutes. The next day, the aqueous dispersion was transferred to a mechanically stirred 5-L round bottomed flask equipped with a thermocouple and vacuum adaptor. The MEK solvent was removed under vacuum (down to approximately 10 torr) and collected with a dry ice condenser. The stripping was conducted for approximately 2 h and maintained at a temperature of 10-25° C. The resulting dispersion was filtered through a 100 mesh screen.

Example 3

Synthesis of 70 wt. % (94 MA/4 MAA/2 nDDM)//30 wt. % DPEPA

A 1-L flask equipped with a mechanical stirrer and reflux condenser was charged with methyl ethyl ketone (126.8 g) solvent and heated to 80° C. A monomer mixture was prepared with methyl acrylate (MA) (282.0 g), methacrylic acid (MAA) (12.0 g), and 1-dodecylmercaptan (6.0 g) (nDDM). An initiator feed was prepared by dissolving Trigonox 25-C75 (t-butylperoxypivalate 75% solution in mineral spirits, 5.3 g) in methyl ethyl ketone (54.6 g) (MEK). The monomer mix was fed in to the reaction over 2 hours at 80° C. then rinsed with 25 g MEK, while the initiator mix was fed in concurrently over 2.5 hours, enabling a 30 minute overfeed. Following completion of the initiator feed, the reaction was held at 80° C. for 2 hours. After the 2 hour hold the reaction was cooled to 60° C. At 60° C., triethyl amine (12.7 g) was charged and the mixture held for 10 minutes. At this point 2,2,6,6-Tetramethyl-1-piperidinyloxy (TEMPO) (0.032 g in 3.2 g MEK) was added to inhibit the reaction and held for an additional 10 minutes. After the inhibitor was charged the multi-ethylenically unsaturated monomer dipentaerythritol pentaacrylate (DPEPA) (128.5 g) was added to the reaction mixture. After letting the multi-ethylenically unsaturated monomer mix in for 10 minutes the entire mixture was transferred to a dispersion vessel containing stirring water (660 g) over a period of 15 minutes where it self-emulsified. The resulting aqueous dispersion was transferred to a mechanically stirred 5-L round bottomed flask equipped with a thermocouple and vacuum adaptor. The MEK solvent was removed under vacuum (down to approximately 10 torr) and collected with a dry ice condenser. The stripping was conducted for approximately 2 h and maintained at a temperature of 10-25°

C. The resulting dispersion was filtered through a 100 mesh screen. Ingredients are presented in Table 1.1, below.

TABLE 1.1

| Ingredient | Amount Charged (g) |
|---|---|
| MA | 282.0 |
| MAA | 12.0 |
| nDDM | 6.0 |
| TRIGONOX 25-C75 | 5.3 |
| TEA | 12.7 |
| TEMPO | 0.032 |
| DPEPA | 128.5 |
| Dispersion Water | 659.7 |

Example 4

Synthesis of 50 wt. % (94 MA/4 MAA/2 nDDM)//50 wt. % DPEPA

The synthesis was conducted in the same manner as that for Example 3, above, except that the amounts of raw materials charged were as indicated in Table 1.2, below:

TABLE 1.2

| Ingredient | Amount Charged (g) |
|---|---|
| MA | 282.0 |
| MAA | 12.0 |
| nDDM | 6.0 |
| TRIGONOX 25-C75 | 5.3 |
| TEA | 12.7 |
| TEMPO | 0.032 |
| DPEPA | 300.0 |
| Dispersion Water | 756.3 |

Example 5

Synthesis of 70 wt. % (96 MA/2 MAA/2 nDDM)//30 wt. % DPEPA

The synthesis was conducted in the same manner as that for Example 3, above, except that the amounts of raw materials charged were as indicated in Table 1.3, below.

TABLE 1.3

| Ingredient | Amount Charged (g) |
|---|---|
| MA | 288.0 |
| MAA | 6.0 |
| nDDM | 6.0 |
| TRIGONOX 25-C75 | 5.3 |
| TEA | 6.4 |
| TEMPO | 0.032 |
| DPEPA | 300.0 |
| Dispersion Water | 659.7 |

Example 6 (Comparative)

Synthesis of 95 wt. % MA/3 wt. % MAA/2 wt. % nDDM)

The synthesis was conducted in the same manner as that for Example 3, above, except that the amounts of raw materials charged were as indicated in Table 1.4, below.

TABLE 1.4

| Ingredient | Amount Charged (g) |
|---|---|
| MA | 285.0 |
| MAA | 9.0 |
| nDDM | 6.0 |
| TRIGONOX 25-C75 | 5.3 |
| TEA | 9.5 |
| TEMPO | 0 |
| DPEPA | 0 |
| Dispersion Water | 649.1 |

Example 7

Synthesis of 70 wt. % (95 MA/3 MAA/2 nDDM)//30 wt. % DPEPA

The synthesis was conducted in the same manner as that for Example 3, above, except that the amounts of raw materials charged were as indicated in Table 1.5, below.

TABLE 1.5

| Ingredient | Amount Charged (g) |
|---|---|
| MA | 285.0 |
| MAA | 9.0 |
| nDDM | 6.0 |
| TRIGONOX 25-C75 | 5.3 |
| TEA | 9.5 |
| TEMPO | 0.032 |
| DPEPA | 128.5 |
| Dispersion Water | 659.6 |

Example 8

Synthesis of 66.7 wt. % (94 MA/4 AA/2 nDDM)//33.3 wt. % DPEPA

The synthesis was conducted in the same manner as that for Example 1, above, except that the amounts of raw materials charged were as indicated in Table 1.6, below.

TABLE 1.6

| Ingredient | Amount Charged (g) |
|---|---|
| MEK | 175.1 |
| MA | 376.0 |
| Acrylic Acid (AA) | 16.0 |
| nDDM | 8.00 |
| AIBN | 8.00 |
| TEA | 20.22 |
| TEMPO | 0.05 |
| DPEPA | 200.0 |
| Dispersion Water | 945.0 |

Example 9

Synthesis of 70 wt % (97.7 MA/1.7 IA/0.6 MAA Emulsion Polymer//30 wt. % DPEPA

A monomer emulsion is prepared using 793.0 g deionized (DI) water, 27.1 g (28% active) sodium lauryl sulfate, 1465.5 g MA, 25.5 g itaconic acid (IA), 9.0 g MAA, and 11.6 g (33% active) Aerosol A-103 surfactant. A 5-L, 4-neck round bottom flask containing an initial charge of 1100.0 g DI water and 27.1 g (33% active) sodium lauryl sulfate is cooled to 20° C. under nitrogen sweep. An aliquot of monomer emulsion (666.2 g) is added to the flask along with a rinse of 56.2 g DI water. The reaction is initiated by addition of 20.0 g iron sulfate (0.15% solution), an ammonium persulfate solution (APS, 0.8 g in 23.9 g DI water) and a solution of LYKOPON™ sodium hydrosulfite (0.3 g) (Dow) and sodium sulfoxylate formaldehyde (SSF, 0.3 g) in 20.0 g water. An exotherm was observed and the reaction temperature increased to 66° C. After the peak exotherm the remaining monomer emulsion was fed in over 120 min with cofeeds of APS (1.2 g in 119.8 DI water) and SSF (0.8 g in 119.8 g DI water) added over 130 min. The contents of the reaction flask are maintained at 62° C. during the feeds. When all the additions are complete the monomer emulsion container is rinsed with 30 g DI water and the APS container is rinsed with 5 g of water and the SSF container rinsed with 5 g DI water, which are added to the reaction flask. Solutions of 2.0 g t-butyl hydroperoxide (70% active) in 15.5 g DI water and 1.0 g SSF in 34.0 g DI water were added over 50 min. The polymer is neutralized with 15.0 g aqueous ammonia (28%). The solid content of the acrylic dispersion is 37.5%.

A monomer emulsion of DPEPA (dipentaerythritol pentaacrylate) was prepared as follows: 0.9 g of TERGITOL™ 15-S-20 anionic surfactant (80 wt. % actives) was dissolved in 15.1 g DI water. To this solution was added 24.0 g DPEPA. The mixture was emulsified using a bench top Rotor Stator homogenizer at 6500 rpm for 2 min. 18.8 g of this mixture was added to 70.0 g of the previously prepared acrylic emulsion polymer and mixed using a high speed mixer at 3000 rpm for 30 min.

TABLE 2

Characterization Data for Examples

| Example | pH | Solids | PS (nm) | Viscosity (cP)[1] | Multi-acrylate Loading | Acid Content | Resists Monomer Separation |
|---|---|---|---|---|---|---|---|
| 3 | 8.2 | 40.6% | 76 | 1048 | 30% DPEPA | 4% | Y |
| 4 | 8.4 | 45.5% | 95 | 344 | 50% DPEPA | 4% | Y |
| 5* | 8.8 | 44.2% | large | 57 | 30% DPEPA | 2% | Y |
| 6* | 9.0 | 33.0% | 244 | 156 | None | 3% | n/a |
| 7 | 9.2 | 41.0% | 95 | 460 | 30% DPEPA | 3% | Y |
| 9* | 7.5 | 42.3% | 127 | ND** | 30% DPEPA | 2.3[2] | N |

*Denotes Comparative Example;
ND—not determined:
[1]Viscosity is measured at 25° C. with a Brookfield viscometer using a shear rate of 60 rpm;
[2]1.7% itaconic acid/0.6% methacrylic acid.

As shown in Table 2, above, all of the inventive Examples 3, 4, 5, and 7 provided aqueous dispersions having acceptable viscosities, even at 45% solids. The presence of acid in the amount of 3 or 4 wt. %, based on the weight of monomers used to make the acrylic solution polymers in Examples 3, 4 and 7 insures dispersion stability; in contrast, the presence of less than 2.25 wt. % of acid, based on the weight of monomers used to make the acrylic solution polymers, in Example 5 does not give stable dispersions and gives uncontrolled particle size. In contrast to Comparative Example 6, the presence of a multi-ethylenically unsaturated acrylate in Examples 3, 4 and 7 results in a smaller particle size which in a dispersion enables the provision of higher solids stable dispersion compositions. In contrast to the inventive aqueous dispersions, a mixture of an emulsion polymer and dipentaerythritol pentaacrylate (DPEPA) lead to separation of an oily layer of monomer after a few days to a week.

TABLE 3

Characterization Data for Examples

| Example | pH | Solids | Particle Size (nm) | Viscosity (cP) | Acrylate Mer Loading | Resists Monomer Separation |
|---|---|---|---|---|---|---|
| 1 | 9.1 | 41.4% | 247 | 97 | 50% | Y |
| 2 | 8.1 | 37.8% | 60 | 512 | 30% | Y |
| 8 | 8.4 | 34.0% | 198 | 260 | 33% | Y |

As shown in Table 3, above, each of Examples 1, 2 and 8 gave stable neutralized aqueous dispersions wherein the 4 wt. % acid, based on the weight of monomers used to make the acrylic solution polymers, enabled controlled particle size. Dispersion of the acrylic solution polymers in water proceeded very well to form the aqueous dispersions with multi-ethylenically unsaturated acrylate composition loadings of 30% to 50% based on the final total dispersion solids. The final dispersions came out with higher solids than in the absence of the multi-ethylenically unsaturated acrylates and reasonable viscosities. The measured particle sizes were actually lower when incorporating the multi-ethylenically unsaturated acrylates than in the case of the acrylic solution polymers alone. While some of these Examples also showed significant particle settling, they remained at a relatively low viscosity for their particle sizes and no monomer or oil separation was observed.

As shown in Table 4, below, the dispersion of comparative Example 5 was made with reduced acid levels. Acrylic polymers in Examples 3, 7 and 5 were blended with 30% DPEPA and dispersed. The highest acid functional group level in Examples 3 and 4 gave the lowest particle size. Because these dispersions are dropped into water and self-emulsify, the particle size is controlled by the acid level in the backbone polymer. As the acid level was reduced from 4% to 3% in Example 7, the resulting particle size increased from 76 to 95 nm. When in Example 5, the acid level was reduced to 2 wt. %, based on the weight of all monomers used to make the acrylic solution polymer (corresponding to an acid number of 13), particle size control was lost and the resulting dispersion had a very coarse and broad particle size distribution. In Example 4, below, increasing the multi-ethylenically unsaturated acrylate composition solids level from 30 wt. % to 50 wt. %, based on solids, in the final dispersion increased particle size from 76 to 95 nm, but there is also a large increase in the final solids level achieved while maintaining a reasonable viscosity. The higher solids Example 4 can be stripped to give a 45 wt. % solids dispersion with good stability and relatively low viscosity.

TABLE 4

Effect of Acid Content And Multi-Ethylenically Unsaturated Acrylate Loading On Polymer Composition

| Example | MAA Level | MFA | pH | Solids | PS (nm) | Viscosity (cP) |
|---|---|---|---|---|---|---|
| 3 | 4% | 30% DPEPA | 8.2 | 40.6% | 76 | 1048 |
| 7 | 3% | 30% DPEPA | 9.2 | 41.0% | 95 | 460 |
| 5 | 2% | 30% DPEPA | 8.8 | 44.2% | large | 57 |
| 4 | 4% | 50% DPEPA | 8.4 | 45.5% | 95 | 344 |

In Table 5, below, a UV curing coating composition was formulated in a plastic white paint can and stirred with a 3-bladed propeller stirrer. The formulations and compara-

TABLE 5

Representative Formulation Example 1

| Material Name | Type | Weight |
|---|---|---|
| Aqueous Dispersion of Example 1 | Binder | 96.46 |
| Add while stirring: | | |
| DAROCUR ™ 1173 | Photoinitiator | 0.37 |
| TEGO GLIDE ™ 410 (50% DPM[1]) | Other | 0.24 |
| BYK ™ 346 | Surfactant | 0.21 |
| SURFYNOL ™ 104 | Surfactant | 0.51 |
| Diethoxyacetophenone (DEAP) | Photoinitiator | 0.19 |
| ACRYSOL ™ RM-8W | Thickener | 2.03 |
| Stir ~10 min after thickener addition | | |
| Totals | | 100 |

[1]DPM: Dipropylene Glycol Monobutyl Ether.

TABLE 6

Paint Performance: Gloss, Hardness, And Flexibility

| Formulation Example | Process | 20° gloss | 60° gloss | Dry Thickness (mil) | Pencil Hardness | Mandrel Pass | Cold Check |
|---|---|---|---|---|---|---|---|
| Comparative Emulsion Polymer A | Draw down on Al Panel | 99.9 | 118 | 1.33 | H | 3/16" | N/A |
| CYTEC ™ 7177 | | 100 | 116 | 1.30 | 3H | 1/8" | N/A |
| 2[1] | | 101 | 115 | 1.31 | 2H | Failed | N/A |
| 3[2] | | 97 | 115 | 1.26 | H-2H | 3/4" | N/A |
| Comparative Emulsion Polymer A | Two-layer Spray on Maple | 55.8 | 82.1 | N/A | N/A | N/A | Pass |
| CYTEC ™ 7177 | | 77.5 | 88.3 | N/A | N/A | N/A | Pass |
| 2[1] | | 78.5 | 88.2 | N/A | N/A | N/A | Pass |

[1]Formulation Example 2 used a 5000 Mw Methyl acrylate-polymer with 50 wt. % DPEPA;
[2]Formulation Example 3 used a 40k Mw MA/MMA star polymer with 30% DTMPTA.

tives indicated were applied to the indicated substrate, either a chromate pretreated Aluminum substrate using a 5-mil drawdown bar or a Maple wood substrate using a Devilbiss conventional spray gun (Devilbiss, Ill., USA). For warmth comparison, the coating was either drawn down on oak wood substrate or sprayed on cherry wood substrate using a Devilbiss conventional spray gun. The resulting coating was cured with a UV curing apparatus by Fusion UV Systems using an "H" type Bulb at a dosage of 1.2 J/cm2.

In formulation Examples 2 and 3, the formulation was the same as in formulation Example 1, except that the amount of photoinitiator and rheology modifier was adjusted according to the amount of polymer solids. Some water might be added as need to reach desired viscosity and volume solids.

Draw downs over chromate pretreated aluminum plates were prepared using a 126 micron (5-mil) Dow Latex Film Applicator. The films were dried at room temperature for 15 min, 60° C. oven for 10 min, and then cooled down to room temperature before UV cure. The panels were cured in a UV curing apparatus using an "H" type Bulb. Typical conditions were 2 passes through the unit at ~10 meters/min (31 ftm) (0.6 J/cm$^2$ per pass). The total dosage is 1.2 J/cm$^2$.

For appearance tests on wood, the films were either drawn down on oak wood using 126 micron (5-mil) Dow film applicator or spayed on Cherry wood with a Devilbiss conventional spray gun (Devilbiss, Ill., USA) with wet thickness ~126 micron (5 mil). Warmth is a subjective appearance characteristic related to the color, depth, grain definition, etc.

TABLE 7

1-Hour Chemical Resistance

| Formulation Example | Process | 50% EtOH | IPA | N-butyl Acetate | Acetone | MEK |
|---|---|---|---|---|---|---|
| Comparative Emulsion Polymer A | Draw down on Al Panel | 10 | 10 | 10 | 10 | 10 |
| CYTEC ™7177 | | 10 | 10 | 10 | 10 | 10 |
| 2[1] | | 10 | 10 | 10 | 10 | 9 |
| 3[2] | | 9 | 10 | 10 | ND | 0 |
| CYTEC ™7177 | Two-layer Spray on Maple Wood | 10 | 10 | 10 | 10 | 10 |
| 2[1] | | 10 | 10 | 10 | 10 | 9 |

[1]Formulation Example 2 used a 5000 Mw Methyl acrylate-polymer with 50 wt. % DPEPA;
[2]Formulation Example 3 used a 40k Mw MA/MMA star polymer with 30% DTMPTA.

TABLE 5

16-hour Chemical Resistance

| Example ID | Process | D.I. Water | Formula 409 | Red Ink | 50% EtOH |
|---|---|---|---|---|---|
| Comparative Emulsion Polymer A | Draw down on Al Panel | 5 | 5 | 6 | 10 |
| CYTEC ™ 7177 | | 10 | 10 | 10 | 10 |
| 2[1] | | 10 | 10 | 10 | 8 |
| CYTEC ™ 7177 | Two-layer Spray on Maple Wood | 10 | 10 | 10 | 10 |
| 2[1] | | 10 | 10 | 10 | 10 |

[1]Formulation Example 2 used a 5000 Mw Methyl acrylate -polymer with 50 wt. % DPEPA.

As shown in Tables 4 and 5, above, the coatings of Formulation Examples 2 and 3 gave appearance performance similar to that of an ultraviolet (UV) curing polyurethane aqueous dispersion and gave very good chemical resistance results. In addition the compositions of Formulation Examples 2 and 3 provided wood coatings that have very good warmth, much better than the formulation of Comparative Emulsion Polymer A.

We claim:

1. A method of making an ultraviolet (UV) curing aqueous coating composition comprising:
    a) polymerizing in organic solvent a monomer mixture of i) 80 wt. % to 100 wt. %, based on the total weight of monomer solids in the monomer mixture, of one or more $C_1$ to $C_3$ alkyl acrylate monomer, ii) from 2.25 to 8 wt. %, based on the total weight of monomer solids in the monomer mixture, of an ethylenically unsaturated acid functional monomer, and iii) the remainder of one or more vinyl monomer, to form an acrylic solution polymer having acid functional groups and having a number average molecular weight of from 3,500 to 50,000 g/mole, and neutralizing at least a portion of the acid functional groups in the acrylic solution polymer to form a neutralized acrylic solution polymer,
    b) combining the neutralized acrylic solution polymer with a multi-ethylenically unsaturated acrylate composition comprising one or more monomer, oligomer or a mixture thereof, such that the monomer composition has an average of from 3.2 to 10 ethylenically unsaturated groups and such that the oligomer or mixture thereof composition has on average from 3.2 to 20 ethylenically unsaturated groups, in the amount of from 20 to 80 wt. %, based on the total weight of the acrylic solution polymer solids and multi-ethylenically unsaturated acrylate composition solids, to form an organic mixture, and,
    c) dispersing the organic mixture in water to form an aqueous dispersion of multi-ethylenically unsaturated acrylate composition imbibed acrylic solution polymer particles.

2. The method as claimed in claim 1, further comprising removing organic solvent from the aqueous dispersion to give a substantially solvent-free aqueous dispersion.

3. The method as claimed in claim 1, wherein the one or more $C_1$ to $C_3$ alkyl acrylate monomer is methyl acrylate.

4. The method as claimed in claim 1, wherein the monomer mixture comprises 90 wt. % or more, based on the total weight of monomer solids in the monomer mixture, of one or more $C_1$ to $C_3$ alkyl acrylate monomer.

5. The method as claimed in claim 1, wherein the acrylic solution polymer is a branched polymer.

6. The method as claimed in claim 1, wherein the acrylic solution polymer has a number average molecular weight of from 4,500 to 40,000 g/mol.

7. The method as claimed in any one of claims 1 to 6, wherein the monomer mixture further comprises a chain transfer agent in the amount of from 1 to 5 wt. % based on the total weight of monomer solids in the monomer mixture.

8. The method as claimed in any one of claims 1 to 6, further comprising inhibiting the polymerization reaction after polymerization.

9. The method as claimed in any one of claims 1 to 6, wherein the neutralizing of the acrylic solution polymer comprises contacting the acrylic solution polymer with an amine neutralizer.

10. The method as claimed in claim 1, wherein the multi-ethylenically unsaturated acrylate monomer composition has an average an average of from 3.5 to 6.5 ethylenically unsaturated groups.

11. A substantially solvent free aqueous dispersion containing less than 0.5 wt. % of solvent, based on the total weight of the composition and made by the methods of claim 1, the aqueous dispersion comprising a composition having one or more ultraviolet (UV) initiator and particles of acrylate polymer containing a multi-ethylenically unsaturated acrylate composition.

* * * * *